(12) United States Patent
Liu et al.

(10) Patent No.: US 10,581,043 B2
(45) Date of Patent: Mar. 3, 2020

(54) FRAME FOR PORTABLE ELECTRICAL ENERGY STORAGE CELLS

(71) Applicant: Gogoro Inc., Hong Kong (CN)

(72) Inventors: Tai-Tsun Liu, New Taipei (TW); Po-Chang Yeh, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 62 days.

(21) Appl. No.: 15/894,794

(22) Filed: Feb. 12, 2018

(65) Prior Publication Data

US 2018/0277809 A1 Sep. 27, 2018

Related U.S. Application Data

(63) Continuation of application No. 15/276,402, filed on Sep. 26, 2016, now Pat. No. 9,893,335.

(60) Provisional application No. 62/235,981, filed on Oct. 1, 2015.

(51) Int. Cl.
| | |
|---|---|
| *H01M 10/052* | (2010.01) |
| *H01M 2/10* | (2006.01) |
| *H01M 2/12* | (2006.01) |
| *H01M 10/653* | (2014.01) |

(52) U.S. Cl.
CPC ......... *H01M 2/1094* (2013.01); *H01M 2/105* (2013.01); *H01M 2/1235* (2013.01); *H01M 10/653* (2015.04); *H01M 2200/10* (2013.01); *H01M 2220/30* (2013.01)

(58) Field of Classification Search
CPC .......................... H01M 2/1094; H01M 10/052
See application file for complete search history.

(56) References Cited

U.S. PATENT DOCUMENTS

| | | |
|---|---|---|
| D221,081 S | 7/1971 | Kahn |
| D227,773 S | 7/1973 | Dafler et al. |
| 5,866,276 A | 2/1999 | Ogami et al. |
| D472,209 S | 3/2003 | Wada et al. |
| D472,210 S | 3/2003 | Tada et al. |
| D476,294 S | 6/2003 | Tada et al. |
| D476,620 S | 7/2003 | Tada et al. |

(Continued)

FOREIGN PATENT DOCUMENTS

| | | |
|---|---|---|
| CA | 2865976 | 9/2013 |
| CN | 102110795 | 3/2015 |

(Continued)

OTHER PUBLICATIONS

International Search Report and Written Opinion, dated Oct. 18, 2016, for corresponding International Application No. PCT/US2016/031653, 12 pages.

(Continued)

*Primary Examiner* — Olatunji A Godo
(74) *Attorney, Agent, or Firm* — Perkins Coie LLP

(57) ABSTRACT

A portable electrical energy storage device is provided with a frame that includes a plurality of receptacles for receiving a portion of a portable electrical energy storage cell. A cap is provided over the plurality of receptacles and the portion of the portable electrical energy storage cells received in the frame. In some embodiments, a passageway extends between adjacent receptacles. Disposed within the passageway is a plug which exhibits more resistance to thermal energy migration than other portions of the frame that define the adjacent receptacles.

20 Claims, 7 Drawing Sheets

(56) References Cited

U.S. PATENT DOCUMENTS

| | | | |
|---|---|---|---|
| 6,938,775 B2 * | 9/2005 | Gaffney | B65D 83/0454 206/471 |
| D573,948 S | 7/2008 | Itagaki et al. | |
| 7,433,794 B1 | 10/2008 | Berdichevsky et al. | |
| D582,416 S | 12/2008 | Duarte et al. | |
| D588,537 S | 3/2009 | Allen | |
| D603,792 S | 11/2009 | Ferro | |
| 7,749,650 B1 | 7/2010 | Hermann | |
| 7,993,155 B2 | 8/2011 | Heichal et al. | |
| 8,006,793 B2 | 8/2011 | Heichal et al. | |
| 8,013,571 B2 | 9/2011 | Agassi et al. | |
| 8,114,540 B2 | 2/2012 | Trester et al. | |
| 8,286,743 B2 | 10/2012 | Rawlinson | |
| 8,361,642 B2 | 1/2013 | Hermann et al. | |
| 8,367,233 B2 | 2/2013 | Hermann et al. | |
| 8,481,191 B2 | 7/2013 | Hermann | |
| 8,541,126 B2 | 9/2013 | Hermann et al. | |
| D693,765 S | 11/2013 | Workman et al. | |
| 8,609,268 B2 | 12/2013 | Fuhr et al. | |
| D711,820 S | 8/2014 | Zeng | |
| D723,462 S | 3/2015 | Druker et al. | |
| D733,050 S | 6/2015 | Chiang | |
| D733,651 S | 7/2015 | Liu | |
| D738,302 S | 9/2015 | Jeong et al. | |
| 9,893,335 B2 | 2/2018 | Liu et al. | |
| 2006/0073377 A1 | 4/2006 | Al-Hallaj et al. | |
| 2008/0050637 A1 | 2/2008 | Prakash et al. | |
| 2008/0220321 A1 | 9/2008 | Yonemochi et al. | |
| 2008/0254357 A1 | 10/2008 | Liu | |
| 2009/0075163 A1 | 3/2009 | Shevock et al. | |
| 2010/0028758 A1 | 2/2010 | Eaves et al. | |
| 2010/0104928 A1 | 4/2010 | Nishino et al. | |
| 2010/0114800 A1 | 5/2010 | Yasuda et al. | |
| 2011/0008655 A1 | 1/2011 | White et al. | |
| 2011/0091749 A1 | 4/2011 | Chow | |
| 2011/0159339 A1 | 6/2011 | Gregor et al. | |
| 2011/0159340 A1 | 6/2011 | Hu et al. | |
| 2011/0189525 A1 | 8/2011 | Palanchon et al. | |
| 2012/0018116 A1 | 1/2012 | Mathur et al. | |
| 2012/0225331 A1 | 9/2012 | Tartaglia | |
| 2012/0244399 A1 | 9/2012 | Tartaglia | |
| 2012/0312615 A1 | 12/2012 | Rawlinson | |
| 2013/0071717 A1 | 3/2013 | Muniz | |
| 2013/0153317 A1 | 6/2013 | Rawlinson et al. | |
| 2013/0216884 A1 | 8/2013 | Takasaki et al. | |
| 2014/0072855 A1 | 3/2014 | Schaefer | |
| 2014/0079978 A1 | 3/2014 | Al-Hallaj et al. | |
| 2014/0368032 A1 | 12/2014 | Doerndorfer | |

FOREIGN PATENT DOCUMENTS

| | | |
|---|---|---|
| EP | 2302727 | 3/2011 |
| EP | 2610943 | 7/2013 |
| EP | 2181481 | 10/2013 |
| JP | 2008091233 | 4/2008 |
| JP | 2009021223 | 1/2009 |
| JP | 2013030384 | 2/2013 |
| JP | 2013120694 | 6/2013 |
| JP | 2015011956 | 1/2015 |
| TW | 201721933 | 6/2017 |
| WO | 2013128007 | 9/2013 |
| WO | 2013128009 | 9/2013 |
| WO | 2013131548 | 9/2013 |
| WO | 2017058722 | 6/2017 |

OTHER PUBLICATIONS

International Search Report and Written Opinion, dated Jul. 28, 2016, for corresponding International Application No. PCT/US2016/019910, 11 pages.

International Search Report and Written Opinion, dated Dec. 26, 2014, for corresponding International Application No. PCT/US2014/053418, 16 pages.

International Search Report and Written Opinion, dated Feb. 10, 2017, for corresponding International Application No. PCT/US2016/053749, 16 pages.

* cited by examiner

FRAME FOR PORTABLE ELECTRICAL ENERGY STORAGE CELLS

CROSS REFERENCE TO RELATED APPLICATIONS

This application is a continuation of U.S. application Ser. No. 15/276,402, filed Sep. 26, 2016 (U.S. Pat. No. 9,893,335), which claims priority to U.S. Application No. 62/235,981, filed Oct. 1, 2015, which are incorporated by reference herein in their entireties.

BACKGROUND

Technical Field

The present disclosure generally relates to portable electrical energy storage devices which house a plurality of portable electrical energy storage cells, including frames for retaining individual portable electrical energy storage cells in an array within the portable electrical energy storage cell device.

Description of the Related Art

Batteries such as lithium-ion batteries are known for packing more energy into smaller, lighter units. Lithium-ion batteries have found wide application in powering portable electronic devices such as cell phones, tablets, laptops, power tools and other high-current equipment. The low weight and high energy density also makes lithium-ion batteries attractive for use in hybrid vehicles and fully electric-powered vehicles.

A potential shortcoming of lithium-ion batteries is their electrolyte solutions. Unlike other types of batteries, in which the electrolytes consist of aqueous solutions of acid or base, the electrolyte in lithium-ion cells typically consists of lithium salts in organic solvents such as ethylene carbonate and ethyl methyl carbonate (which can be flammable).

Under normal operation, charging a lithium-ion battery causes lithium ions in the electrolyte solution to migrate from the cathode through a thin porous polymer separator and insert themselves in the anode. Charge balancing electrons also move to the anode but travel through an external circuit in the charger. Upon discharge, the reverse process occurs, and electrons flow through the device being powered.

In very rare circumstances, internal or external short-circuiting of a lithium-ion battery can occur. For example, the electric-powered device containing the lithium-ion battery can undergo a severe impact or shock resulting in a breach in the battery, which could result in a short circuit. Due to the thin nature of the polymer separator, micrometer-sized metal particles generated during cutting, pressing, grinding, or other battery manufacturing steps can be present or find their way into the battery cell. These small metal particles can accumulate and eventually form a short circuit between the anode and the cathode. Such short circuits are to be avoided because they can result in temperatures at which the cathode may react with and decompose the electrolyte solution, generating heat and reactive gases such as hydrocarbons. Typically, at normal operating temperatures, lithium-ion batteries are very stable; however, above a certain temperature, lithium-ion battery stability becomes less predictable, and at an elevated temperature, chemical reactions within the battery case will produce gases resulting in an increase in the internal pressure within the battery case. These gases can react further with the cathode, liberating more heat and producing temperatures within or adjacent to the battery that can ignite the electrolyte in the presence of oxygen. When the electrolyte burns, small amounts of oxygen are produced, which may help fuel the combustion. At some point, build-up of pressure within the battery case results in the battery case rupturing. The escaping gas may ignite and combust. Some battery manufacturers design their cells so, in the unlikely event a cell ruptures and ignites, gases that support combustion exit the cell in predetermined locations and directions. For example, battery cells in the shape of conventional AAA or AA cells may be designed to vent from the terminal ends located at each end of the cell, near the cathode and anode.

In applications where only a single lithium-ion battery is utilized, failure of a battery and the potential for combustion creates an undesirable situation. The severity of this situation is increased when a plurality of lithium-ion batteries are deployed in the form of a battery bank or module. The combustion occurring when one lithium-ion battery fails may produce local temperatures above the temperature at which other lithium-ion batteries are normally stable, causing these other batteries to fail, rupture, and vent gases which then ignite and combust. Thus, it is possible for the rupture of a single cell in a bank of lithium-ion cells to cause other cells in the bank to rupture and discharge gases which ignite and burn. Fortunately, lithium-ion batteries have proven to be very safe, and the failure and consequent rupture of a lithium-ion battery is a very rare event. Nonetheless, efforts have been made to reduce the risk of rupture and ignition of gases exiting a ruptured lithium-ion battery. For example, development of materials used for cathodes has produced lithium-based cathode materials that tolerate heat better than cathodes made from the widely used lithium cobalt oxide. While these more recently developed materials may be more heat tolerant, this benefit comes at a price. For example, lithium manganese oxide cathodes have a lower charge capacity than lithium cobalt oxide and still decompose at high temperatures. Lithium iron phosphate cathodes stand up especially well to thermal abuse; however, their operating voltage and energy density on a volume basis are lower than those of lithium cobalt oxide cathodes.

Other efforts have focused on the polymer separator and its design. For example, it has been proposed to utilize a polymer separator that sandwiches a layer of polyethylene between two layers of polypropylene in an effort to provide a degree of protection against mild overheating. As the temperature of the cell begins to approach that at which the stability of the cell becomes unpredictable, the polyethylene melts and plugs the pores in the polypropylene. When the pores of a polypropylene are plugged by the polyethylene, lithium diffusion is blocked, effectively shutting the cell down before it has a chance to ignite. Other efforts have focused on utilizing polymer separators having melting points higher than polypropylene. For example, separators made from polyimides and separators made from high molecular weight polyethylene and an embedded ceramic layer have been proposed to form a robust higher melting point polymer separator. Formulating and utilizing less flammable electrolytes and nonvolatile, nonflammable ionic liquids, fluoroethers, and other highly fluorinated solvents as battery electrolytes have also been investigated. Researchers have developed lithium-ion batteries that contain no liquids at all. These solid-state batteries contain inorganic lithium-ion conductors, which are inherently nonflammable and are thus very stable, safe, and exhibit long cycle life and shelf life. However, the manufacture of these solid-state batteries requires costly, labor-intensive vacuum deposition methods.

In addition to these efforts focused on the construction of individual battery cells, efforts have also focused on the design of components used to separate the individual battery cells and hold them in place to form a battery module or pack. Other efforts have focused on other component making up the battery module or pack. One factor which affects the design of components used to retain the individual battery cells as well as the battery module and battery pack is the keen interest in the size of the battery packs and the desire to include as many individual battery cells as possible within a battery module or pack. For example, in some applications the desire is to include as many battery cells as possible into the smallest possible battery pack.

Despite these efforts, there continues to be interest in portable electrical energy storage devices satisfying size criteria and battery density that also effectively manage the risk of electrical energy storage cell failure, combustion of gases produced as a result of such failure, especially in multi-cell deployments, propagation of failure inducing thermal energy to undamaged battery cells adjacent a failed cell, and the hazard to the user in the event of such a rare event.

BRIEF SUMMARY

Embodiments described in this application relate to a first embodiment directed to a frame for retaining a plurality of individual portable electrical energy storage cells in an array within a portable electrical energy storage device. The frame includes receptacles for receiving individual portable electrical energy storage cells. The receptacles are bounded by walls of the frame. In accordance with embodiments described herein, a wall of the frame that bounds a first receptacle includes a second wall portion which is less resistant to thermal energy migration than a first wall portion of the wall of the frame that bounds the first receptacle. The second wall portion of the frame includes a passageway extending between the first receptacle and second receptacle. In accordance with some embodiments described herein, a plug is positioned in at least a portion of the passageway extending between the first receptacle and the second receptacle. The resistance to thermal energy migration of the plug is greater than the resistance to thermal energy migration of the second wall portion.

A second embodiment described herein is directed to the first embodiment wherein the a frame for retaining a plurality of individual electrical energy storage cells in an array within a portable electrical energy storage device includes a first receptacle for receiving a portion of a portable electrical energy storage cell. The first receptacle is bounded by a first wall portion of the frame and a second wall portion of the frame. The second wall portion of the frame also bounds a portion of a second receptacle for receiving a portion of a portable electrical energy storage cell. The second wall portion of the frame includes a passageway extending between the first receptacle and the second receptacle. The second wall portion is less resistant to thermal energy migration than the first wall portion of the frame.

A third embodiment described herein is directed to the first and second embodiments wherein a plug is positioned in at least a portion of the passageway extending between the first receptacle and the second receptacle.

A fourth embodiment described herein is directed to methods of forming a frame for retaining a plurality of individual electrical energy storage cells in an array within a portable electrical energy storage device include a step of providing a frame precursor that includes a first receptacle for receiving a portion of a portable electrical energy storage cell. The first receptacle is bounded by a first wall portion of the frame and a second wall portion of the frame. The second wall portion of the frame precursor bounds a portion of a second receptacle for receiving a portion of a portable electrical energy storage cell. The methods include a step of forming a passageway in the second wall portion of the frame, the passageway extending between the first receptacle and the second receptacle A fifth embodiment described herein is directed to the fourth embodiment including a step of disposing a plug in the passageway formed in the second wall portion, the plug being more resistant to thermal energy migration than the portion of the second wall portion, including the portion of the second wall portion that is removed or absent and forms the passageway.

A sixth embodiment described herein is directed to a frame for retaining a plurality of individual portable electrical energy storage cells in an array within a portable electrical energy storage device includes a first wall portion. The frame also includes a second wall portion. The second wall portion including a section equally or more resistant to thermal energy migration than the first wall portion of the frame and a section having less resistance to thermal energy migration than the section of the second wall portion that has equal or more resistant to thermal energy migration than the first wall portion. The frame includes a receptacle for receiving a portion of a portable electrical energy storage cell, the receptacle being bounded by the first wall portion of the frame and the second one portion of the frame.

A seventh embodiment described herein is directed to portable electrical energy storage devices including frames in accordance with aspects of the first through third embodiments described herein.

An eighth embodiments described herein is directed to a portable electrical energy storage device including a plurality of individual electrical energy storage cells is provided wherein the portable electrical energy storage device includes a frame including a plurality of receptacles, at least one of the plurality of receptacles receiving an end of one of the plurality of individual electrical energy storage cells, the frame being formed from a first material. A cap formed of a second material, different from the first material, covers the frame adjacent the at least one of the plurality of receptacles and covers the end of the one electrical energy storage cell received in the at least one of the plurality of receptacles.

A ninth embodiment described herein is directed to the eighth embodiment wherein the frame includes a passageway extending between the at least one of the plurality of receptacles and another adjacent one of the plurality of receptacles for receiving an end of another electrical energy storage cell, wherein the second material is disposed within the passageway.

A tenth embodiment described herein is directed to the eighth and ninth embodiments wherein the at least one of the plurality of receptacles includes a first receptacle for receiving an end of one of the plurality of individual electrical energy storage cells, the first receptacle bounded by a first wall portion of the frame and a second wall portion of the frame, the second wall portion of the frame bounding a portion of a second receptacle for receiving an end of one of the plurality of individual electrical energy storage cells, the second wall portion of the frame including a passageway extending between the first receptacle and the second receptacle, the second wall portion of the frame being less resistant to thermal energy migration than the first wall portion of the frame.

An eleventh embodiment described herein is directed to the eighth through tenth embodiments wherein the thickness of the second wall portion of the frame is less than the thickness of the first wall portion of the frame.

A twelfth embodiment described herein is directed to the eighth through eleventh embodiments wherein a plug is positioned in at least a portion of the passageway extending between the first receptacle and the second receptacle. In certain embodiment, the plug is a material more resistant to thermal energy migration than a material comprising the second wall portion.

A thirteenth embodiment described herein is directed to the eighth through twelfth embodiments wherein a plurality of peripheral receptacles are located at a periphery of the frame, each of the peripheral receptacles bounded by a peripheral wall, each peripheral wall characterized in part by the absence of a passageway extending through the peripheral wall.

A fourteenth embodiment described herein is directed to the eighth through thirteenth embodiments wherein at least one of the plurality of receptacles of portable electrical energy storage devices include a first wall portion and a second wall portion, the second wall portion including a section equally or more resistant to thermal energy migration than the first wall portion and a section having less resistance to thermal energy migration than the section of the second wall portion that has equal or more resistance to thermal energy migration than the first wall portion.

A fifteenth embodiment described herein is directed through the eighth through fourteenth embodiments wherein the first wall portion comprises a first material and the section of the second wall portion of the frame having less resistance to thermal energy migration than the section of the second wall portion that has equal or more resistance to thermal energy migration than the first wall portion comprises a second material, the first material and the second material being the same.

A sixteenth embodiment described herein is directed to methods of forming a frame for retaining a plurality of individual electrical energy storage cells in an array within a portable electrical energy storage device. Described embodiments include the steps of providing a frame including a plurality of receptacles, at least one of the plurality of receptacles for receiving an end of one of the plurality of individual electrical energy storage cells, the frame formed from a first material, receiving in the at least one of the plurality of receptacles the end of one of the plurality of individual electrical energy storage cells, and forming a cap of a second material over the frame adjacent the at least one of the plurality of receptacles and over the end of one of the plurality of individual electrical energy storage cell received in the at least one of the plurality of receptacles, the second material being different from the first material.

A seventeenth embodiment described herein is directed to the sixteenth embodiment wherein the at least one of the plurality of receptacles includes a first receptacle, the first receptacle bounded by a first wall portion of the frame and a second wall portion of the frame, the second wall portion of the frame bounding a portion of a second receptacle for receiving an end of an individual electrical energy storage cell, the second wall portion of the frame being less resistant to thermal energy migration than the first wall portion of the frame and include steps of forming a passageway in the second wall portion of the frame, the passageway extending between the first receptacle and the second receptacle and disposing a plug in the passageway.

An eighteenth embodiment described herein is directed to the sixteenth and seventeenth embodiments wherein the plug is a material more resistant to thermal energy migration than a material comprising the second wall portion.

A nineteenth embodiment described herein is directed to the sixteenth through eighteenth embodiments wherein the first wall portion of the frame comprises a first material and the second wall portion of the frame comprise a second material, the first material and the second material being the same.

A twentieth embodiment described herein is directed to frames for retaining a plurality of individual electrical energy storage cells in an array within a portable electrical energy storage device. Such frames include a plurality of receptacles, at least one of the plurality of receptacles receiving an end of one of the plurality of individual electrical energy storage cells, the frame being formed from a first material. Such frames also include a cap formed of a second material, the cap covering the frame adjacent the at least one of the plurality of receptacles and covering the end of the one electrical energy storage cell received in the at least one of the plurality of receptacles, the second material being different from the first material.

A twenty-first embodiment described herein is directed to the twentieth embodiment wherein a passageway extends between the at least one of the plurality of receptacles and another adjacent one of the plurality of receptacles for receiving an end of another electrical energy storage cell, wherein the second material is disposed within the passageway.

A twenty-second embodiment described herein is directed to the twentieth and twenty-first embodiments wherein at least one of the plurality of receptacles includes a first receptacle for receiving an end of one of the plurality of individual electrical energy storage cells, the first receptacle bounded by a first wall portion of the frame and a second wall portion of the frame, the second wall portion of the frame bounding a portion of a second receptacle for receiving an end of one of the plurality of individual electrical energy storage cells, the second wall portion of the frame including a passageway extending between the first receptacle and the second receptacle, the second wall portion of the frame being less resistant to thermal energy migration than the first wall portion of the frame.

A twenty-third embodiment described herein is directed to the twentieth through twenty-second embodiments wherein the thickness of the second wall portion of the frame for retaining a plurality of individual electrical energy storage cells in an array within a portable electrical energy storage device is less than the thickness of the first wall portion of the frame.

A twenty-fourth embodiment described herein is directed to the twentieth through twenty-third embodiments wherein a plug is positioned in at least a portion of the passageway extending between the first receptacle and the second receptacle.

A twenty-fifth embodiment described herein is directed to the twentieth through twenty-fourth embodiments wherein the plug is a material more resistant to thermal energy migration than a material comprising the second wall portion.

A twenty-sixth embodiment described herein is directed to the twentieth through twenty-fifth embodiments wherein the at least one of the plurality of receptacles includes a first wall portion and a second wall portion, the second wall portion includes a section equally or more resistant to thermal energy migration than the first wall portion and a section having less resistance to thermal energy migration than the section of the second wall portion that has equal or more resistance to thermal energy migration than the first wall portion.

A twenty-seventh embodiment described herein is directed to the twentieth through twenty-sixth embodiments wherein the first wall portion includes a first material and the section of the second wall portion of the frame having less resistance to thermal energy migration than the section of the second wall portion that has equal or more resistance to thermal energy migration than the first wall portion includes a second material, the first material and the second material being the same.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
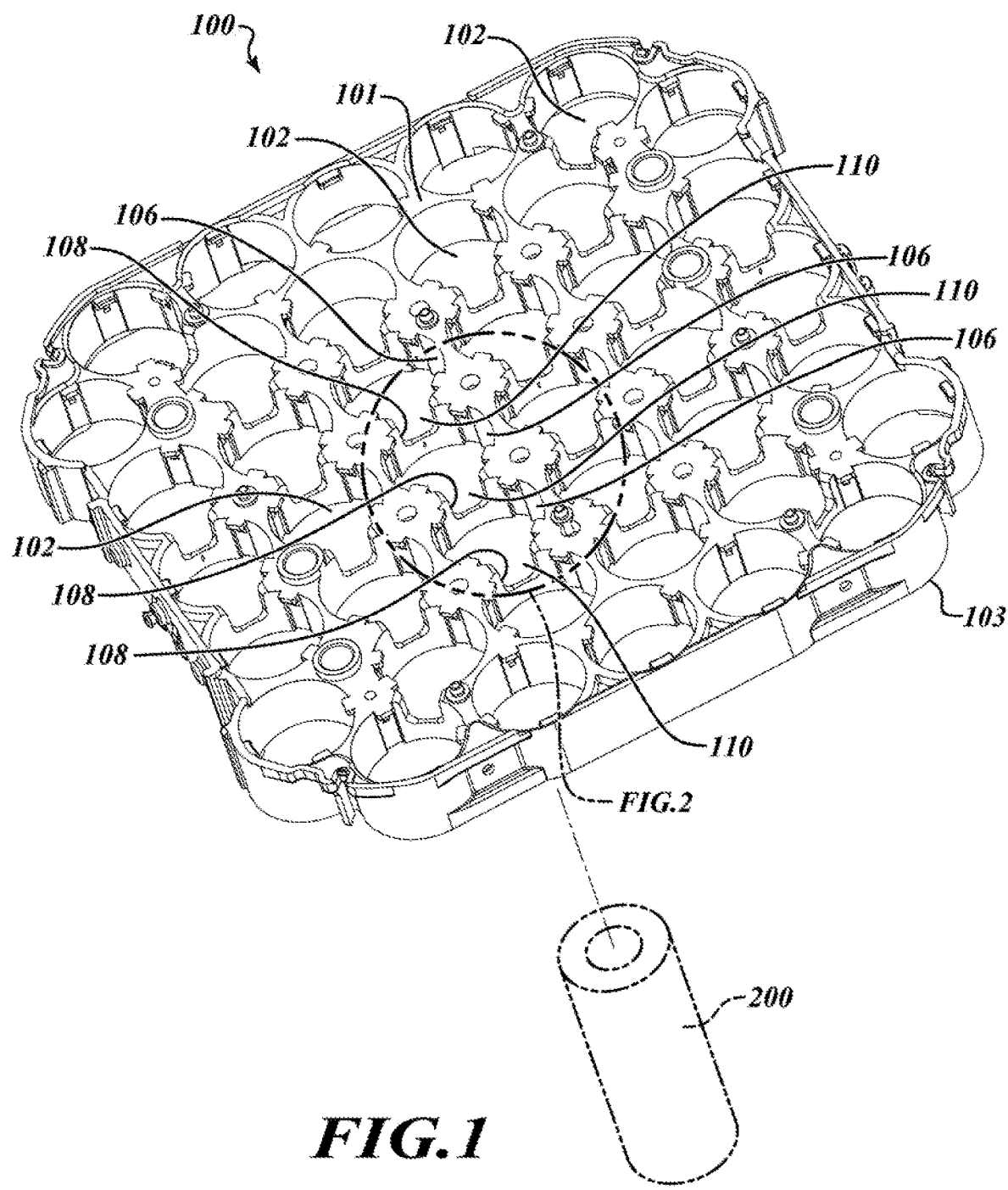
FIG. 1 is an isometric view of the top of a frame for retaining a plurality of individual portable electrical energy storage cells in an array within a portable electrical energy storage device that includes some of the various components or structures described herein, according to one non-limiting illustrated embodiment.

It will be appreciated that, although specific embodiments of the subject matter of this application have been described herein for purposes of illustration, various modifications may be made without departing from the spirit and scope of the disclosed subject matter. Accordingly, the subject matter of this application is not limited except as by the appended claims.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electrical energy storage cells, e.g., batteries, and portable electrical energy storage devices, e.g., battery packs, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, supercapacitors or ultracapacitors, and modules made up of a plurality of the same. Reference to portable electrical energy storage cell(s) means a chemical storage cell or cells, for instance rechargeable or secondary battery cells including, but not limited to, nickel-cadmium alloy battery cells or lithium-ion battery cells. A non-limiting example of portable electrical energy storage cells is illustrated in the figures as being cylindrical, e.g., similar in size and shape to conventional AAA size batteries; however, the present disclosure is not limited to this illustrated form factor.

Examples of portable electrical power storage devices or a portable electrical energy storage devices are packs including a plurality of portable electrical energy storage cells that can be readily moved by hand without the aid of additional devices.

The headings and Abstract of the Disclosure provided herein are for convenience only and do not interpret the scope or meaning of the embodiments.

Generally described, the present disclosure is directed to examples of portable electrical energy storage devices suitable to power electric devices such as electric powered or hybrid type vehicles, e.g., motorcycles, scooters and electric bicycles, electric powered tools, electric powered lawn and garden equipment, and the like, which include one or more electrical energy storage cells. Further description of portable electrical energy storage devices in accordance with embodiments described herein is provided in the context of portable electrical energy storage devices used with electric scooters; however, it should be understood that portable electrical energy storage devices in accordance with embodiments described herein are not limited to applications in electric scooters. In addition, portable electrical energy storage devices are described below with reference to a single electrical energy storage cell module containing a plurality of electrical energy storage cells. The present description is not limited to electrical energy storage devices that include only a single electrical energy storage cell module and encompasses portable electrical energy storage devices that include more than one electrical energy storage cell modules. The present disclosure also describes specific embodiments with respect to the spatial arrangement of portable electrical energy storage cells forming a part of an electrical energy storage cell module. The present description is not limited to the specific spatial arrangement of portable electrical energy storage cells in an electrical energy storage cell module specifically illustrated herein. The present disclosure also applies to spatial arrangements of portable electrical energy storage cells in an electrical energy storage cell module that are different from those specifically illustrated or described herein. The present disclosure also describes specific embodiments with respect to frames for retaining a plurality of individual electrical energy storage cells in an array within a portable electrical energy storage device. The present description is not limited to the specific spatial arrangement of exemplary frames described herein. The present disclosure also applies to frames for retaining a plurality of individual electrical energy storage cells in an array within a portable electrical energy storage device that are different from those specifically illustrated and described herein. For examples, frames in accordance with embodiments described herein can include more or less receptacles and the receptacles can be arranged in geometric patterns different from the geometric patterns of receptacles specifically illustrated and described herein. In addition, the figures of the present description illustrate features on the peripheral edges and top surface of the illustrated frames. The present description is not limited to frames that include such features. Frames in accordance with embodiments described herein may omit such features and/or include other features.

Figure 4:
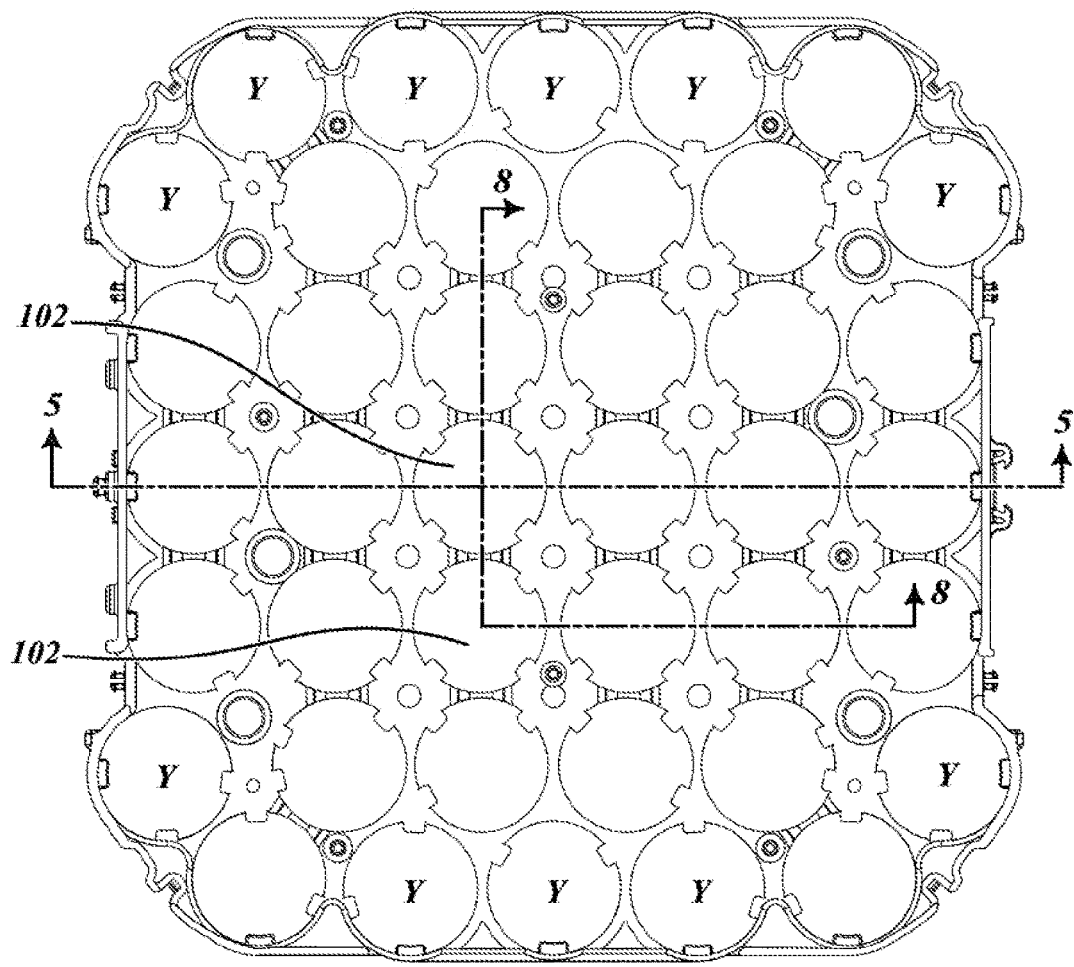
FIG. 4 is a plan view of the top of the frame of FIG. 1, according to one non-limiting illustrated embodiment.
Figure 5:
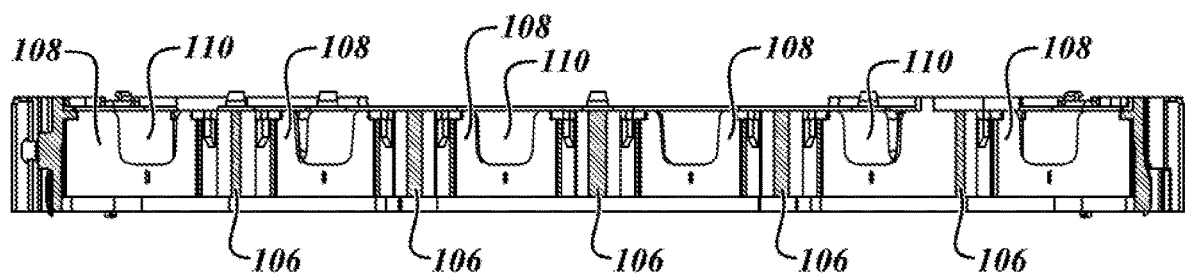
FIG. 5 is a cross-section view taken along line 5-5 in FIG. 4.
Figure 6:
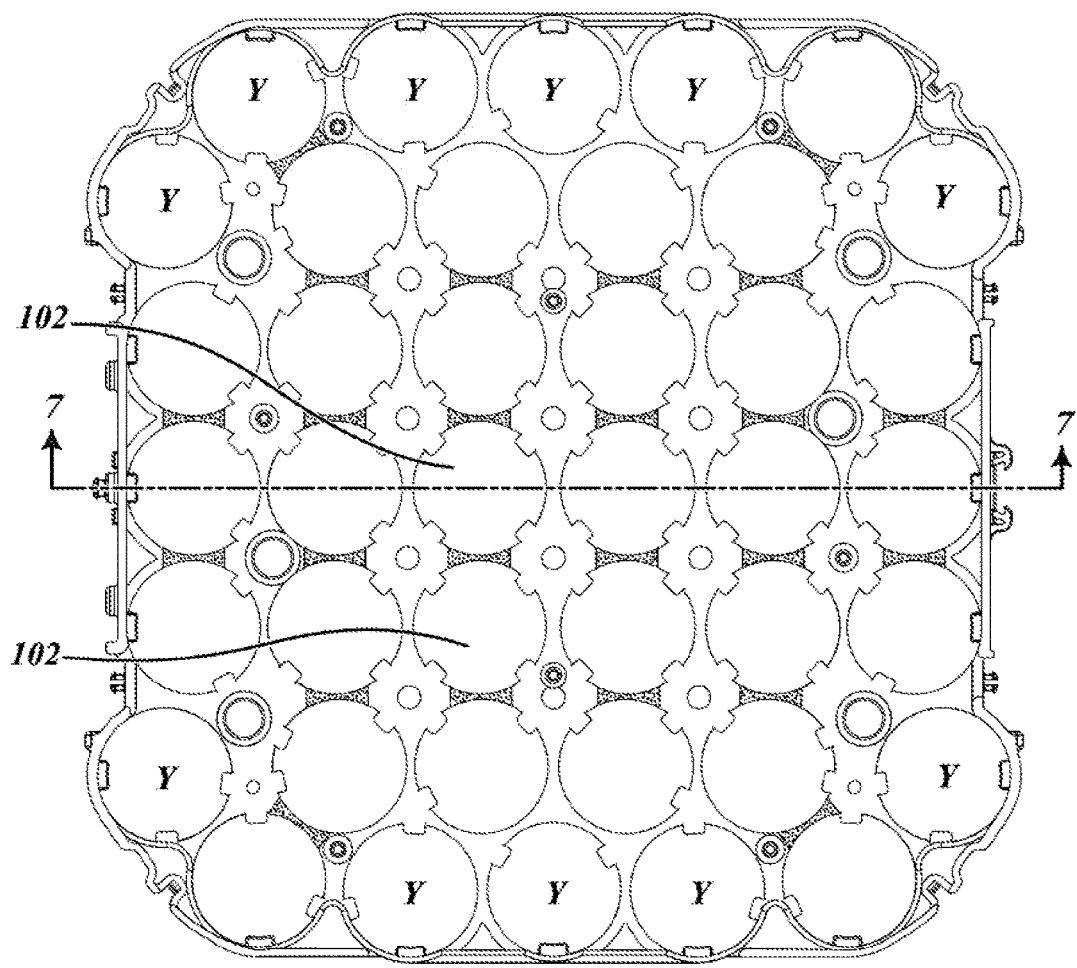
FIG. 6 is a plan view of the top of a frame for retaining a plurality of individual portable electrical energy storage cells in an array within a portable electrical energy storage device that includes some of the various components or structures described herein, according to one non-limiting illustrated embodiment illustrated in FIG. 3.
Figure 7:
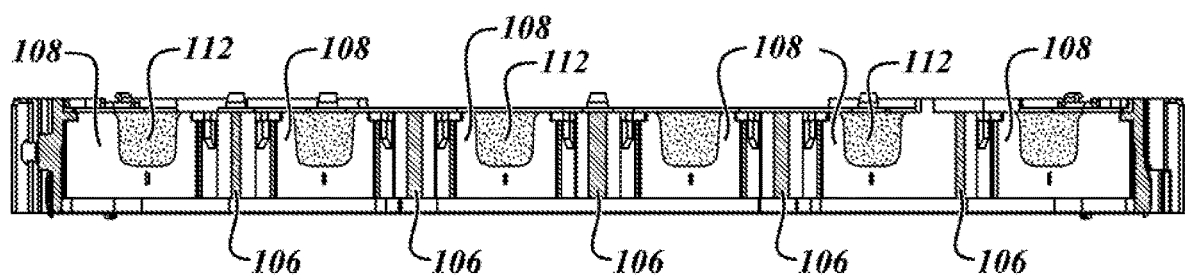
FIG. 7 is a cross-section view taken along line 7-7 in FIG. 6.

Referring to FIG. 1, an exemplary embodiment of a frame 100 for retaining a plurality of individual electrical energy storage cells (200 in FIG. 2) in an array is illustrated. Frame 100 includes a two-dimensional array of a plurality of receptacles 102 arranged in a plurality of first parallel rows and a plurality of second parallel rows extending in a different direction from or perpendicular to the first parallel rows. In addition, the exemplary frame 100 includes a plurality of receptacles identified by reference character Y (FIG. 4) located at the periphery of frame 100. It should be understood that frames for retaining a plurality of individual electrical energy storage cells in an array in accordance with embodiments described herein include receptacles having a shape different from those illustrated in FIG. 1. For example, the receptacles could be square, rectangular, pentagonal, hexagonal or other polygonal or non-polygonal shape that is congruent with the shape of the portable electrical energy storage cells to be received into frame. For example, when the portable electrical energy storage cell has a shape similar to an AA or AAA type battery, the receptacles will have a round shape and be of a diameter that allows electrical energy storage cell to be received into the receptacle with a close tolerance. The tolerance should not be so tight that the portable electrical energy storage cell cannot be easily slid into the receptacle; however, the tolerance should not be so relaxed that after being placed in the receptacle, the electrical energy storage cell is able to be displaced in a radial direction relative to the longitudinal axis of the portable electrical energy storage cell.

Figure 2:
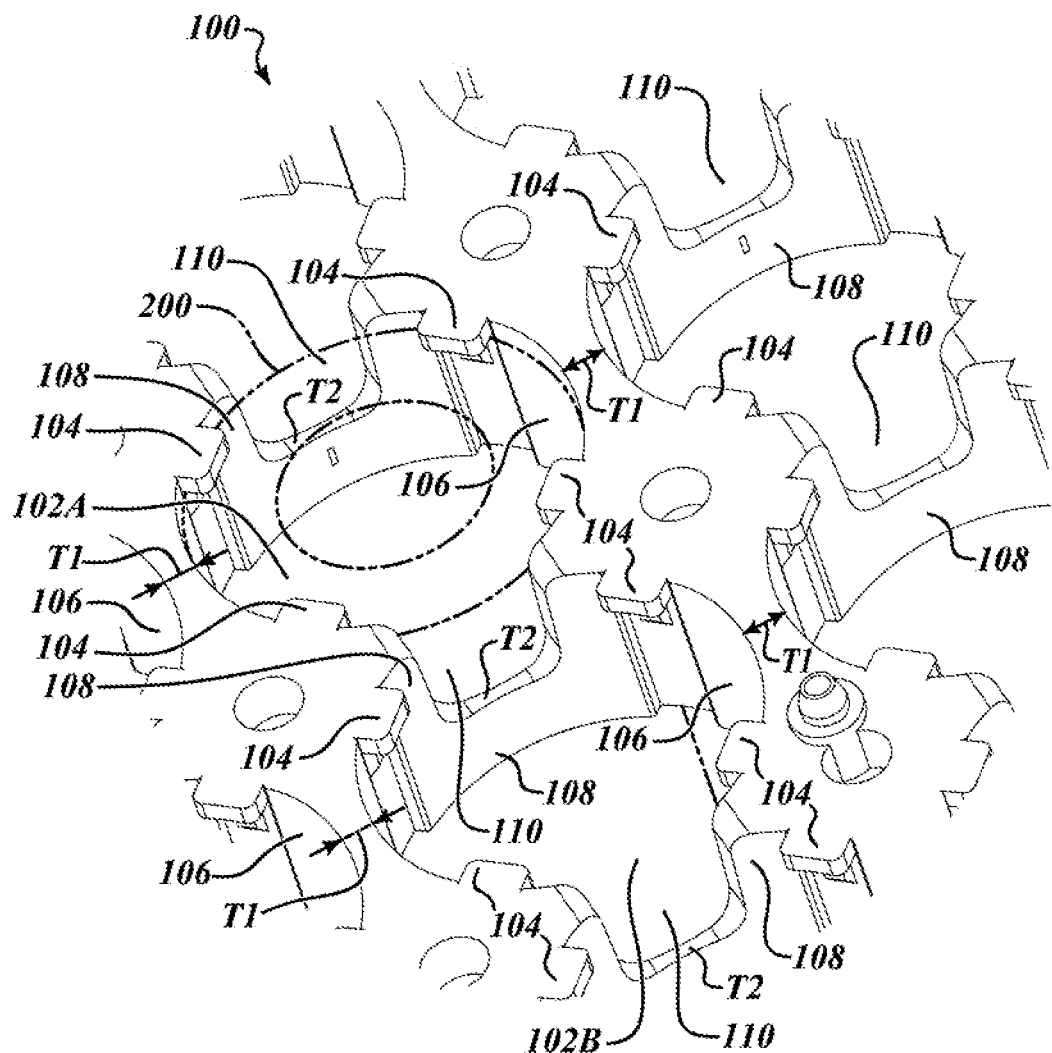
FIG. 2 is an isometric view of an enlarged portion of the frame of FIG. 1, according to one non-limiting illustrated embodiment.

Referring additionally to FIG. 2, frame 100 includes a plurality of tabs 104 positioned on a top surface 101 of frame 100. Tabs 104 extend over a small portion of respective receptacles 102. In the embodiment illustrated in FIG. 1, some receptacles include four tabs 104 extending over a portion of the receptacle, while other receptacles include fewer tabs 104, for example, two or three tabs. In accordance with embodiments described herein, fewer tabs 104 may be provided for specific receptacles, e.g., one tab. Tabs 104 contact the top of portable electrical energy storage cells 200 that are inserted into the receptacles from below and serve as a stop to restrict further insertion of the portable electrical energy storage cells 200.

Frame 100 is made of a material (e.g., a first material) that is lightweight, strong, and able to be molded using plastic molding processes, such as rotational, injection, blow or compression molding. Materials that can be molded using plastic molding processes include materials that have a heat deflection temperature, as determined by ASTM D648, within a range of about 95 to about 120° C. The material from which frame 100 is formed will exhibit resistance to thermal energy migration (e.g., act as a thermal barrier), especially thermal energy migration through walls of the frame that separate one receptacle from an adjacent receptacle. Such resistance to thermal energy migration includes the ability to resist thermal energy migration through walls of the frame resulting from conduction, convection or radiation. A resistance to thermal energy migration is manifested by the material from which frame 100 is formed being fire resistant at temperatures the frame is exposed to when a portable electrical energy storage cell fails (e.g., an exemplary suitable material exhibits fire resistant properties that satisfy Underwriters Laboratories UL-94 V-0 standard test, but suitable materials are not limited to those satisfying the UL-94 V-0 test) and/or having a melting point that is higher than temperatures the frame is exposed to when a portable electrical energy storage cell fails (e.g., an exemplary suitable material has a melting point on the order of about 270° C., but suitable materials are not limited to having a melting point of about 270° C.) Suitable materials also include materials having a higher or lower melting point; and/or having desirable thermal insulating properties (e.g., an exemplary suitable material has a thermal conductivity on the order of about 0.19 to about 0.22 W/m-K, but suitable materials are not limited to having a coefficient of thermal conductivity in this range. Suitable materials also include materials having a higher or lower coefficient of thermal conductivity.)

Examples of materials from which frame 100 may be formed include thermoplastic materials and thermoset materials, such as acrylic resins, polyester resins, polypropylene resins, polyethylene resins, polycarbonate resins, polyvinyl chloride resins, polystyrene resins, acrylonitrile butadiene styrene resins, polyurethane resins, maleimides, melamine formaldehydes, phenol formaldehydes, polyepoxides and polyimides. It is understood that the foregoing list is not exhaustive and that frame 100 may be formed from other materials capable of providing resistance to thermal energy migration through walls of the frame a portable electrical energy storage cell fails.

The array of individual portable electrical energy storage cells 200 formed when such cells are retained within the plurality of receptacles 102 of frame 100 may be contained within a housing (not illustrated) of a portable electrical energy storage device housing, such as the housing described and illustrated in U.S. Patent Application Publication 2015/000645514. Although only a single frame 100 is illustrated in FIG. 1, it should be understood that a second frame (not illustrated) can be utilized as a bottom frame to receive the ends of portable electrical energy storage cells 200 that are not received in frame 100 illustrated in FIG. 1 (e.g., when frame 100 in FIG. 1 serves as a top frame). When frame 100 is used in this manner, it is understood that frame 100 in FIG. 1 would be rotated 180 degrees from the orientation shown in FIG. 1 so that it can receive ends of portable electrical energy storage cells 200 opposite the ends of portable electrical energy storage cells received in frame 100 of FIG. 1.

In embodiments where a portable electrical energy storage device includes a plurality of arrays of portable electrical energy storage cells 200, e.g., in the form of a plurality of portable electrical energy storage cell modules stacked one on top of each other, a modification of frame 100 in accordance with embodiments described herein includes a unitary frame having one side configured to receive bottoms of the portable electrical energy storage cells making up an upper module and an opposing side configured to receive the top of portable electrical energy storage cells making up a lower module.

Referring to FIG. 2, each receptacle 102 in FIG. 2 is bounded by at least one first wall portion 106 and at least one second wall portion 108. In the illustrated embodiment of FIG. 2, receptacle 102A is bounded by two first wall portions 106 on opposite sides of receptacle 102A and bounded by two second wall portions 108 on opposite sides of receptacle 102A. Thus, in FIG. 2, first wall portions 106 and second wall portions 108 bounding receptacle 102A can be generally described as being radially offset from each other by 90°.

Figure 8:
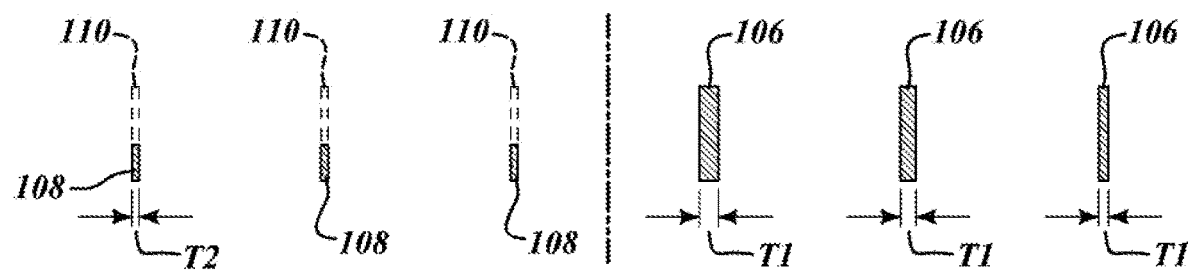
FIG. 8 is a cross-section view taken along line 8-8 in FIG. 4.

In the interest of forming a compact portable electrical energy storage cell module with a small form factor and a high density of portable electrical energy storage cells, in the exemplary embodiment illustrated in FIGS. 1, 2, 4, 5, and particularly FIG. 8, thickness T2 of second wall portions 108 is less than the thickness T1 of first wall portions 106. It should be understood that the present description is not limited to thicknesses T1 and T2, nor is it limited to first wall portion 106 having a thickness greater than the thickness of second wall portions 108. For example, thickness T2 could be greater than thickness T1. In other embodiments in accordance with the present description, a receptacle 102 can be bounded by a first wall portion 106 having a thickness T1 and different first wall portion 106 having a thickness different than T1. In yet other embodiments in accordance with the present description, a receptacle 102 could be bounded by a second wall portion 108 having a thickness T2 and another second wall portion 108 having a thickness different from T2. The specific thickness T1 and T2 may be selected taking into consideration the specific material from which frame 100 is formed and that materials resistance to thermal energy migration. For example, depending on the material used to form frame 100, T2 may be greater than about 1 mm and T1 may be less that about 1 mm. It is understood that these ranges of thicknesses for T1 and T2 are exemplary and that T2 may be less than 1 mm and T1 maybe more than 1 mm.

In some embodiments, the first wall portion 106 is formed with a thickness T1 that allows the first wall portion 106 to exhibit satisfactory resistance to thermal energy migration.

Referring to FIG. 2, in the illustrated exemplary embodiment, second wall portions 108 include a passageway or opening 110 extending between receptacle 102A and an adjacent receptacle 102B that are otherwise separated by second wall portion 108. In the illustrated embodiment of FIG. 2, passageways 110 are generally rectangular in profile; however, the present description is not limited to passageway 110 of a general rectangular profile. The profile of passageways 110 can be different from those specifically illustrated in FIG. 2. For example, the profile of passageways 110 could be semicircular or a different polygonal shape.

Referring to FIGS. 4 to 7, the depth of passageways 110 illustrated in FIG. 2 is approximately ½ of the height of the second wall portion 108. The depth of passageways 110 can be greater or less than the depth illustrated in the exemplary embodiment of FIG. 2; however; passageways 110 preferably do not extend entirely from the top 101 of frame 100 to a bottom 103 of frame 100. It is not necessary that each passageway 110 have the same depth, i.e., different passageways can have different depths. As explained below in more detail, the particular depth of a passageway 110 is partly determined by the location where portable electrical energy storage cells are believed to be most susceptible to rupture upon failure of such portable electrical energy storage cell.

In some embodiments, a frame 100 has at least a receptacle defined by a wall of a frame 100 including one passageway 110 extending entirely from the top 101 of frame 100 to a bottom 103 of frame 100.

Passageways 110 can be formed a number of different ways in accordance with embodiments described herein. For example, passageways 110 can be formed during the process of molding frame 100. Alternatively, passageways 110 can be formed after the frame 100 is molded by removing a portion of frame 100 to form passageways 110.

Though not intending to be bound by any particular theory, it is believed hot gases (generated upon failure of portable electrical energy storage cells of the type that can be combined with frames in accordance with the present description to form portable electrical energy storage cell modules) usually escape the portable electrical energy storage cell adjacent the top cover and/or bottom cover of the portable electrical energy storage cell. The reason for this observation is uncertain, but could be related to the stresses imparted on the cell during the manufacturing process, particularly the attachment of the top cover or bottom cover to the portable electrical energy storage cell. When such hot gases escape the portable electrical energy cell adjacent the top cover and/or the bottom cover, they (and/or flames resulting from combustion of the escaping gases) impinge upon first wall portions 106 or the second wall portions 108 or both. The resistance to thermal energy migration of these first wall portions 106 and the second wall portions 108 depends in part upon the material from which frame 100 is formed and the thickness of first wall portions 106 and second wall portions 108. If first wall portions 106 and second wall portions 108 are formed from the same material, the thicker wall portion will typically exhibit a higher or greater resistance to thermal energy migration.

The size and location of passageways 110 can be determined based on a number of factors, including the location where escaping hot gases and/or flames from a failing portable electrical energy storage cell will impinge upon the second wall portions 108 and/or the section of the second wall portions where the resistance to thermal energy migration is lowest. When hot gases and/or flames escape a failing portable electrical energy cell near the top cover of the cell, a larger percentage of such gases and flames will impinge upon second wall portion 108 in the vicinity of passageway 110 compared to the section of second wall portion 108 below passageway 110. Thus, the depth of passageway 110 can be selected taking into consideration the location where hot gases and flames will escape from a failing portable electrical energy storage cell when the failing portable electrical energy storage cell is retained within frame 100. In order to maintain the physical integrity of the frame 100, it is preferred that passageway 110 does not extend completely from the top 101 to the bottom 103 of frame 100. In some embodiments, the section of second wall portion 108 remaining after passageway 110 is formed, is thicker than the section of second wall portion 108 removed to form passageway 110. This increased thickness of the section of second wall portion 108 remaining after passageway 110 is formed provides added resistance to thermal energy migration compared to when this remaining section of second wall portion 108 is the same thickness as the section of second wall portion 108 removed to form passageway 110. In certain embodiments, second wall portion 108 includes a section that exhibits equal or greater resistance to thermal energy migration than first wall portion 106 of frame 100. Furthermore, in certain embodiments, second wall portion 108 includes a section having less resistance to thermal energy migration than the section of second wall portion 108 that exhibits equal or greater resistance to thermal energy migration than first wall portion 106.

When first wall portion 106 and second wall portion 108 are formed from the same material and the thickness T2 of second wall portion 108 is less than the thickness T1 of first wall portion 106, second wall portion 108 is less resistant to thermal energy migration (i.e., less able to retard or prevent thermal energy migration through second wall portion 108 as compared to thicker first wall portion 106) from receptacle 102A containing a portion of a failing portable electrical energy storage cell to the adjacent receptacle 102B which contains a non-failing portable electrical energy storage cell. Retarding and/or preventing such thermal energy migration reduces the likelihood that the temperature of portable electrical energy storage cell 200 in adjacent receptacle 102B will reach levels at which failure of such portable electrical energy storage cell may occur. Retarding and/or preventing such thermal energy migration also reduces the likelihood that hot gases or flames escaping from the failed portable electrical energy storage cell will cause external physical damage to the un-failed portable electrical energy storage cell in adjacent receptacle 102B.

Figure 3:
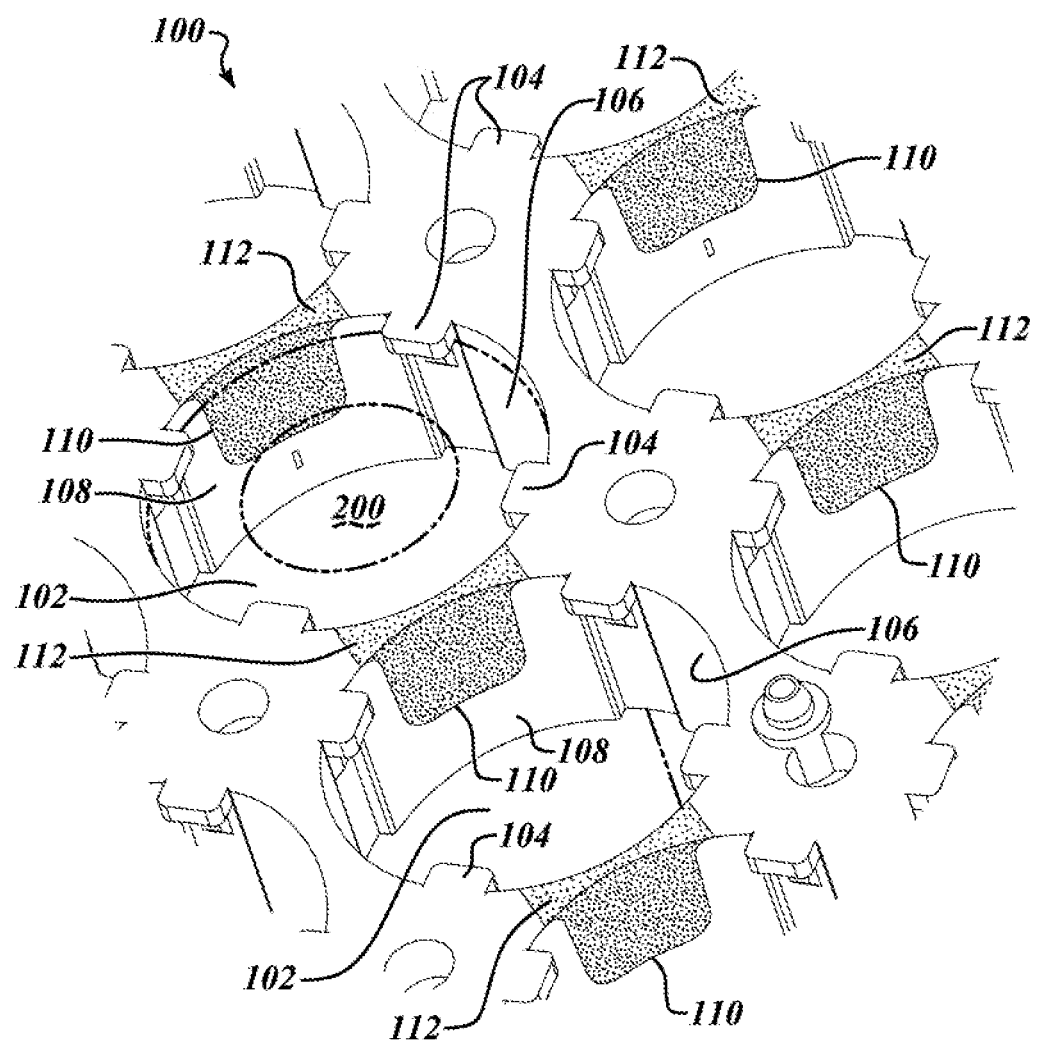
FIG. 3 is an isometric view of an enlarged portion of the frame of FIG. 1, with components described herein but not illustrated in FIG. 2, according to one non-limiting illustrated embodiment.

Referring to FIG. 3, in accordance with exemplary embodiments described herein, passageways 110 include a plug 112. Plug 112 may have a shape that is nearly identical to or similar to the shape of passageway 110, whether passageway 110 is formed by removing a section of second wall portion 108 or whether passageway 110 is formed when frame 100 is molded or formed. Plug 112 is formed from a material (e.g., a second material) that is more resistant to thermal energy migration (or has a higher fire resistant rating) than the material making up second wall portion 108. When plug 112 is provided in passageways 110, thermal energy migration from receptacle 102A containing a failing portable electrical energy storage cell 200 to adjacent receptacle 102B containing a portable electrical energy storage cell which has not begun to fail is reduced. Increasing the ability of frame 100, especially in the vicinity of second wall portion 108, to resist or prevent such thermal energy migration decreases the likelihood that portable electrical energy storage cell 200 in adjacent receptacle 102B will fail due to exposure to elevated temperatures and/or damage to the case of the portable electrical energy storage cell which has not begun to fail. In some embodiments, the increased resistance to thermal energy migration of the material from which plug 112 is formed ranges from about 1.5 to about 3 times the resistance to thermal energy migration exhibited by the material from which frame 100 is formed.

A material is more resistant to thermal energy migration compared to another material when it transmits less thermal energy by conduction, convection and/or radiation. Materials suitable for plug 112 include materials that are lightweight, strong, and able to be molded using plastic molding processes, such as rotational, injection, blow or compression molding. Such materials include materials that are more resistant to thermal energy migration, less combustible, have more fire retardant effect, more fire resistant, are better able to prevent or reduce fire propagation, have a higher melting point, are more resistant to deformation, are better able to withstand exposure to flames or hot gases on one side without propagating combustion to an opposite side, and/or are a better thermal insulator than the material from which the second wall portion 108 is formed. Suitable materials for forming plug 112 will depend upon the material forming second wall portion 108; however, suitable materials include the materials used to form a second wall portion 108 supplemented with fire retardant materials, such as glass fiber, nylon 66, and the like. Other suitable materials include fire retardant glues mixed with fire retardant materials, such as glass fiber, nylon 66 or the like. Plug 112 can also be formed from silicone-based materials or silicone-based glues, mica and glass. Other examples of materials from which plug 112 may be formed include those from which frame 100 can be formed, provided plug 112 is formed from a material that is more resistant to thermal energy migration than the material that forms second wall portion 108. Such materials include thermoplastic materials and thermoset materials, such as acrylic resins, polyester resins, polypropylene resins, polyethylene resins, polycarbonate resins, polyvinyl chloride resins, polystyrene resins, acrylonitrile butadiene styrene resins, polyurethane resins, maleimides, melamine formaldehydes, phenol formaldehydes, polyepoxides and polyimides. It is understood that the foregoing list is not exhaustive and that plug 112 may be formed from other materials exhibiting greater resistance to thermal energy migration than the material forming second wall portion 108. Plug 112 may also be formed from a metallic material provided plug 112 is sized and positioned to not come in electrical contact with the electrodes of the portable electrical energy storage cell.

Figure 9:
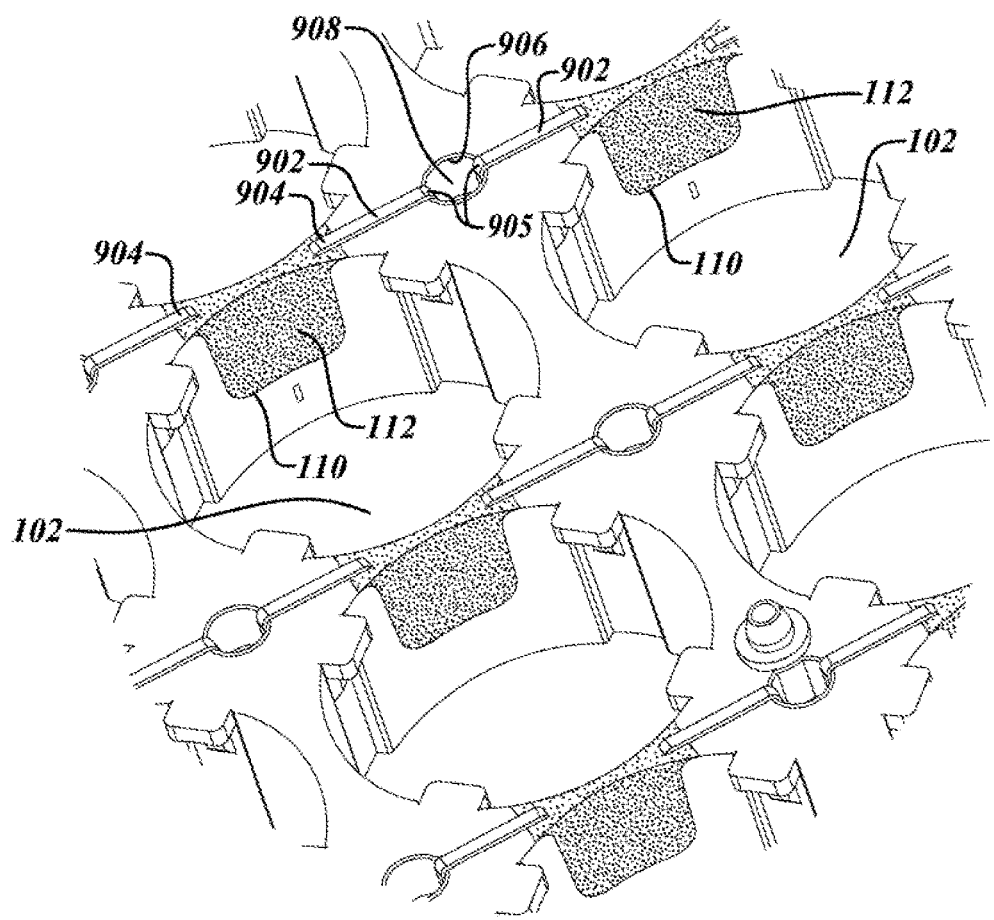
FIG. 9 is an isometric view of the enlarged portion of the frame of FIG. 1, with components or structures described herein but not illustrated in FIG. 2, according to one non-limiting illustrated embodiment.

Plug 112 can be formed in situ or ex situ. In situ formation involves placement of the individual portable electrical energy storage cells 200 in receptacles 102 before formation of plug 112 within passageways 110. Once portable electrical energy storage cells 200 are in place, the material from which plug 112 will be formed or a fluid precursor of such material may be injected into or flowed into passageways 110. Once in place, such material or its precursor is allowed to cure or harden. Alternatively, plug 112 can be formed in situ within passageways 110 before portable electrical energy storage cells 200 are positioned within frame 100 by inserting a jig or other replica of the array of portable electrical energy storage cells into frame 100 prior to injection or flowing of the material from which plug 112 will be formed into passageways 110. Depending upon the particular material used to form plug 112, adhesion between plug 112 and first wall portion 106 may be sufficient to hold plug 112 in place, e.g., via a chemical retainer. Ex situ formation of plug 112 may involve formation of plug 112 using a mold and removing plug 112 from the mold after it has hardened or cured. Alternatively, plug 112 may be formed using a stamping or cutting process. The ex situ form plug 112 can then be secured within passageways 110 prior to or after inserting the portable electrical energy storage cells into the respective receptacles. An ex situ formed plug 112 can be secured in passageway 110 mechanically by a friction fit or chemically using adhesives. Though not illustrated, passageways 110 or a portion of passageways 110 can be provided with a male or female feature suitable for mating with a corresponding female or male feature on the plug to help secure plug 112 within passageway 110. Alternatively, as illustrated in FIG. 9, mechanical fasteners or retainers 902 can be provided to mechanically secure plugs 112 within passageways 110. In the embodiment illustrated in FIG. 9, mechanical retainers 902 include one end 904 secured to a portion of plug 112 and another end 905 permanently or reversibly secured to a feature of frame 100. For example, in FIG. 9, the end 905 of mechanical retainer 902 opposite the end 904 secured to plug 112, is secured to a lip 906 formed in opening 908 of frame 100. It should be understood that plug 112 can be mechanically secured within passageway 110 using mechanical retainers or fasteners of a different design than those specifically illustrated in FIG. 9. For example, the end 904 of retainer 902 could be secured to plug 112 at locations other than those illustrated in FIG. 9. Similarly, the end 905 of mechanical retainer 902 could be secured to frame 100 in a different manner than that illustrated in FIG. 9. A plurality of plugs 112 may also be formed as an interconnected array of plugs spatially arranged to coincide with the location of a plurality of passageways within frame 100. Such arrangement of a plurality of plugs could then be inserted in the plurality of passageways in one step.

Figure 10:
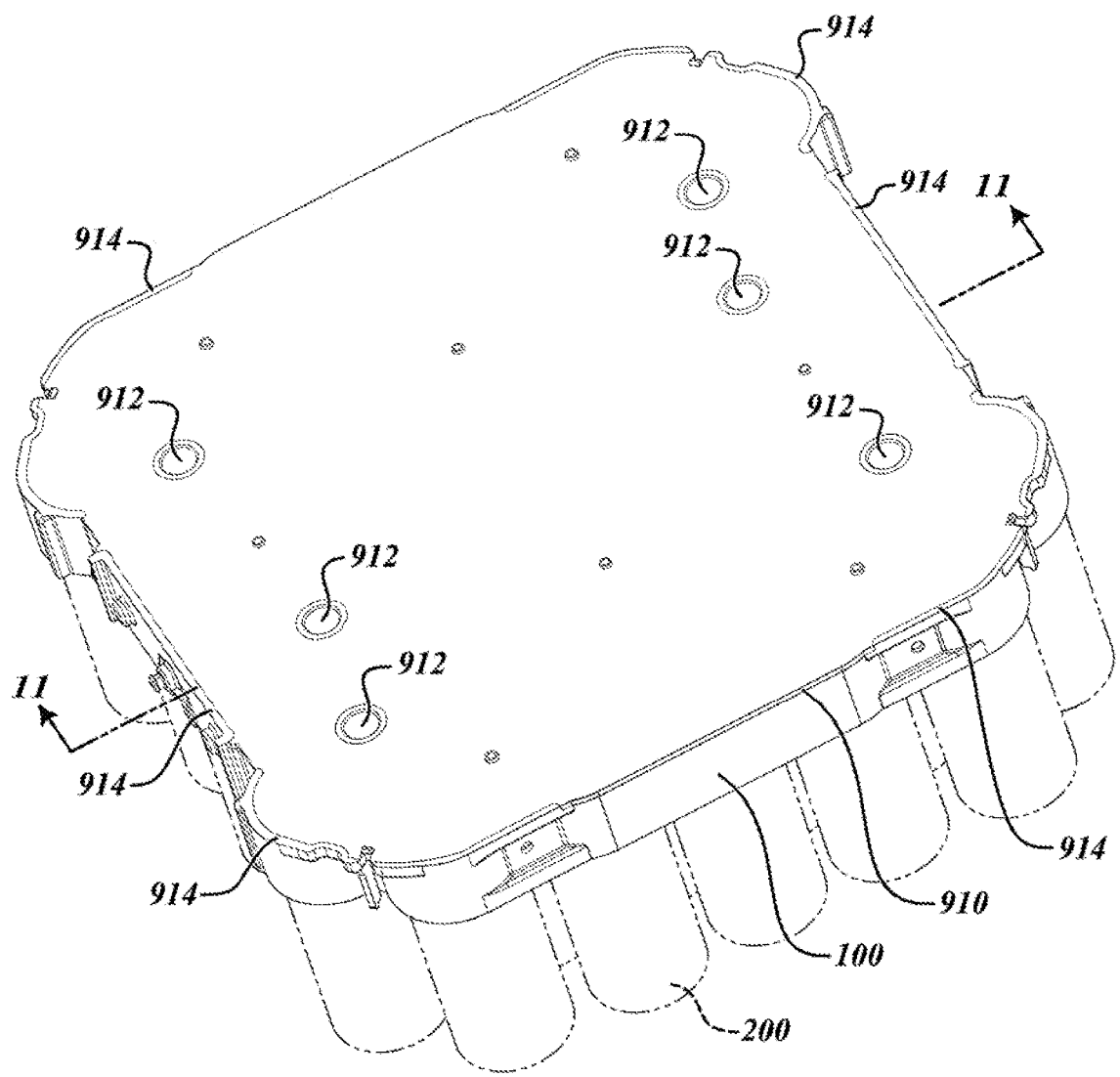
FIG. 10 is an isometric view of another non-limiting embodiment a frame for retaining a plurality of individual portable electrical energy storage devices in an array within a portable electrical energy storage device.
Figure 11:
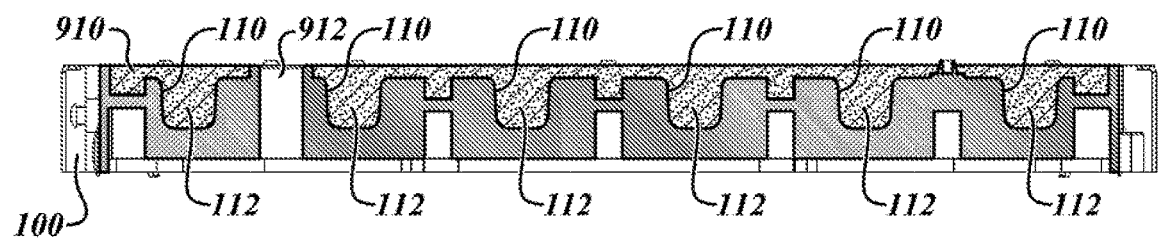
FIG. 11 is a cross-section view taken along line 11-11 in FIGS. 6 and 10.

Referring to FIGS. 10 and 11, when plug 112 is formed according to an embodiment of the in-situ technique described above, second material from which plug 112 is formed or a fluid precursor of such material is applied to the top of frame 100 (which has received the portable electrical energy storage devices into receptacles of the frame) and flows into passageways 110. The material fills passageways 110 and also flows into any gaps between portable electrical energy storage cells 200 and frame 100. As passageways 110 fill, the material spreads out over the top of frame 100 and the tops of portable electrical energy storage cells 200. As the material spreads out, it covers the top of frame 100 and tops of portable electrical energy storage cells 200 received by frame 100. Though not illustrated in FIGS. 10 and 11, terminals of individual portable electrical energy storage cells 100 received in frame 100 are connected to each other by electrically conductive connectors. The second material flows into gaps between these electrical connectors and the individual portable electrical energy storage cells and gaps between the electrical connectors and the frame. In exemplary embodiments, the top of frame 100, tops of portable electrical energy storage devices within frame 100 and the electrical connectors become embedded or encased in the second material. As illustrated in FIGS. 10 and 11, the applied second material forms a cap, cover or layer 910 on top of frame 100. Depending upon the materials from which cap 910 is formed, cap 910 forms a structure that reduces the risk of explosion, fire propagation and/or leakage of explosive gas in the unlikely event an individual portable electrical energy storage cell 200 fails. Cap 910 reduces the risk of explosion and/or leaking of explosive gases from a failed or failing portable electrical energy storage cell by creating a seal around the top of the portable electrical energy storage cells through which combustible gas, that might leak from a failed or failing portable electrical energy storage cell, cannot pass. Oxygen needed to support combustion of combustible gas that leaks from a failed cell also cannot pass through the seal provided by cap 910. Cap 910 reduces the risk of fire propagation by acting as a barrier through which flames cannot pass. Cap 910 can also serve as a thermal barrier which impedes the transfer of thermal energy from one side of cap 910 where a failing portable electrical energy storage cell 200 is located to an opposite side of cap 910 where a non-failing portable electrical energy storage cell 200 is located. In addition, when cap 910 holds frame 100, portable electrical energy storage cells 200 and the electrical connections between portable electrical energy storage cells 200 in a rigid fixed relationship, the risk of that the electrical connectors will detach from portable electrical energy storage cells 200 and/or other electrical terminals is reduced.

Referring to FIG. 10, the outer periphery of frame 100 includes a upward extending flange 914 which, among other things, serves to contain the second material when it is flowed or injected on the top of frame 100 to form cap 910. In embodiments where second material has a viscosity and/or cure rate that limits the degree to which the second material flows after being applied to the top of frame 100 reliance on upward extending flange 914 to prevent the second material from flowing over the sides of the top of frame 100 in not necessary. On the other hand, in embodiments where second material has flow and/or cure properties that enable it to flow past the outer periphery of frame 100 and over the sides of frame 100, upward extending flange 914 acts as a dam or retainer, preventing a portion of the applied second material from flowing past the outer periphery of frame 100 and over the sides of frame 100. In such embodiments, the top of cap 910 formed from second material substantially coincides the top of upward extending flange 914. In yet other embodiments, after second material is applied to the top of frame 100, excess glue can be scraped away, using the top of upward extending flange as a guide. Scraping the applied second material in this manner causes the second material to spread out even more and fills gaps that have not yet been filled prior to the scraping.

In an alternative embodiment of controlling the flow of the second material after the second material has been applied to frame 100, the combination of frame 100 with portable electrical energy storage cells 200 seated in frame 100 can be placed in a jig or tool which is shaped to mate with surface of the frame to which second material is applied and limit the flow of the second material to locations where cap 910 is to be formed. In the exemplary embodiment illustrated in FIG. 10, such jig or device would include six mandrels or tabs which would form openings 912 in cap 910 by prevention the second material from forming cap 190 at the location where the mandrels or tabs are located.

In the exemplary embodiment illustrated in FIGS. 10 and 11, cap 910 extends to and coincides with the outer periphery of frame 100. In other embodiments, cap 910 may extend beyond the outer periphery of frame 100 or may not extend completely to the outer periphery of frame 100. Cap 910 may be formed from any of the second materials described above, including silicone-based materials or silicone-based glues. Cap 910 may also be formed from materials that are not used to form plug 112 provided such materials are able to provide the gas-tight seal described above, are fire proof or fire resistance or can provide the thermal barrier described above. It should also be understood that although formation of cap 910 has been described with reference to second materials used to form plug 112 and in conjunction with forming plug 112, cap 910 can be formed from materials different from the second materials and cap 910 can be formed without forming plug 112.

The exemplary embodiments of cap 910 described herein are not limited to any specific thickness; however, exemplary thicknesses include thicknesses substantially equal to the height of flanges 914. For example, exemplary thicknesses are less than 3 millimeters, less than 2 millimeters or less than 1 millimeter. Exemplary ranges of thicknesses include 0.5-3.0 millimeters, 1.0-2.0 millimeters and 1.5-2.0 millimeters. It should be understood that the thickness of cap 910 can be outside the ranges described above. The thickness or height of frame 100 plus cap 910 measured in a direction parallel to the length of portable electrical energy storage cells 200 received in frame 100 can be less than about ⅕ the length of the portable electrical energy storage cells 200. For example, the thickness or height of frame 100 plus cap 910 can range from between ⅕ to ⅓ the length of portable electrical energy storage cells 200. It should be understood that while the embodiment of cap 910 described above with reference to FIGS. 10 and 11 illustrates a frame 100 that receives the top of portable electrical energy storage cells 200 and cap 910 is formed on top of such frame 100, frame 100 can be rotated 180 degrees (i.e., flipped over relative to the orientation illustrated in FIGS. 10 and 11) and receive the bottom of portable electrical energy storage cells 200. In such configuration the portable electrical energy storage cells 200 are sandwiched between two frames to form a module. In such embodiments, a cap 910 can be provided on the bottom of a frame 100 and will have a configuration that is a mirror image of the cap 910 illustrated in FIGS. 10 and 11.

In the exemplary embodiment of the frame 100 illustrated in FIGS. 1 and 3, a plurality of receptacles are identified by the reference character Y. The receptacles identified by reference character Y are located at the periphery of frame 100 and are not bounded by wall portions of frame 100 that include a passageway 110. It should be understood that those receptacles identified by reference character Y may be provided with a wall portion of frame 100 that includes a passageway 110. In the specific embodiment illustrated in FIG. 1, the receptacles identified by reference character Y are bounded by a peripheral wall portion of frame 100 where the thinner portions of the peripheral wall portion of frame 100 are positioned at locations that are not adjacent to another receptacle, e.g., the thinner portions are adjacent the outer periphery of the frame which faces the housing of the portable electrical energy storage device in which the frame is located. Thus, in certain embodiments, it is desired not to incorporate plugs into these thinner portions in order to retain weak points in the frame that can fail and serve as a vent for hot gases and flames in the event a portable electrical energy storage cell within a receptacle adjacent the frame periphery fails. Failure of the frame at these locations, away from adjacent receptacles, is desired from the standpoint of dissipating thermal energy generated by failing portable electrical energy cells in the space between the portable electrical energy storage cell module and the housing of the portable electrical energy storage device.

Utilization of plug 112 helps to protect a non-failing cell in a receptacle adjacent to a receptacle retaining a failing cell from thermal energy that may raise the temperature of the non-failing cell to a level where failure of the non-failing cell is initiated. In addition, utilization of plug 112 helps to protect the non-failing cell from physical external damage resulting from hot gases or flames impinging upon the non-failing cell. For example, first wall portions 106 and plugs 112 preferably protect a non-failing cell when a side of first wall portions 106 and/or plugs 112 adjacent a failing cell is exposed to temperatures of up to about 1200° C. for about 2-5 seconds which can occur when a portable electrical energy storage cell fails. Satisfactory protection of a non-failing cell when a side of first wall portions 106 and/or plugs 112 is exposed to temperatures of up to about 1200° C. for about 2-5 seconds which can occur when a portable electrical energy storage cell in an adjacent receptacle fails has been observed when at least about 75% of the height of the plug or the first wall portion remains after being exposed to temperatures of up to about 1200° C. for about 2-5 seconds. Alternatively, first wall portions 106 and plugs 112 preferably protect a non-failing cell when a side of first wall portions 106 and/or plugs 112 adjacent a failing cell is exposed to temperatures of up to about 1000° C. for about 2-5 seconds which can occur when a portable electrical energy storage cell fails. Satisfactory protection of a non-failing cell when a side of first wall portions 106 and/or plugs 112 is exposed to temperatures of up to about 1000° C. for about 2-5 seconds which can occur when a portable electrical energy storage cell in an adjacent receptacle fails has been observed when at least about 75% of the height of the plug or the first wall portion remains after being exposed to temperatures of up to about 1000° C. for about 2-5 seconds.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A frame structure for positioning a plurality of individual electrical energy storage cells, the frame structure comprising:
   a top surface;
   a bottom surface opposite to the top surface;
   a plurality of receptacles extending between the top surface and the bottom surface, the individual receptacles having a first depth;
   a plurality of wall portions each positioned between corresponding two of the plurality of receptacles; and
   a passageway formed on at least one of the plurality of wall portions, the passageway having a second depth less than the first depth.

2. The frame structure of claim 1, wherein the plurality of wall portions include a first material, and wherein the passageway is configured to be filled with a second material.

3. The frame structure of claim 2, wherein the first material is more resistant to thermal energy migration than the second material.

4. The frame structure of claim 1, wherein the at least one of the plurality of wall portions where the passageway is formed includes a section wall portion positioned adjacent to the passageway, and wherein the section wall portion includes a first thickness, and wherein the passageway is configured to be filled with a material having a second thickness less than the first thickness.

5. The frame structure of claim 1, wherein the frame structure is configured to couple to a cap configured to cover the plurality of receptacles.

6. The frame structure of claim 1, wherein the frame structure includes a first material, and wherein the frame structure is configured to couple to a cap including a third material, and wherein the third material is different from the first material.

7. The frame structure of claim 1, wherein the passageway is a first passageway formed on a first wall portion, and wherein the frame structure further comprises a second passageway formed on a second wall portion, and wherein the second passageway has a third depth different from the second depth of the first passageway.

8. The frame structure of claim 1, further comprising a plug positioned in the passageway.

9. The frame structure of claim 8, wherein the plug includes a second material more resistant to thermal energy migration than a first material of the plurality of wall portions.

10. The frame structure of claim 8, wherein the plug is formed from a metallic material.

11. The frame structure of claim 1, further comprising a tab extending from one of the plurality of wall portions.

12. The frame structure of claim 11, wherein the tab extends laterally toward an adjacent one of the plurality of receptacles.

13. The frame structure of claim 11, wherein the tab is configured to be in contact with one of the plurality of individual electrical energy storage cells.

14. A frame structure for positioning a plurality of individual electrical energy storage cells, the frame structure comprising:
 a top surface;
 a bottom surface opposite to the top surface;
 a plurality of receptacles extending between the top surface and the bottom surface, the individual receptacles having a first depth;
 a plurality of wall portions each positioned between corresponding two of the plurality of receptacles; and
 a plurality of passageways individually formed on each of the plurality of wall portions, the individual passageways having a second depth less than the first depth.

15. The frame structure of claim 14, wherein the plurality of wall portions include a first material, and wherein the passageway is configured to be filled with a second material, and wherein the first material is more resistant to thermal energy migration than the second material.

16. The frame structure of claim 14, wherein at least one of the plurality of wall portions includes a section wall portion having a first thickness, and wherein the individual passageways having a second thickness less than the first thickness.

17. The frame structure of claim 14, further comprising a cap configured to cover the plurality of receptacles.

18. The frame structure of claim 17, wherein the frame structure includes a first material, and wherein the cap includes a third material, and wherein the third material is different from the first material.

19. The frame structure of claim 14, further comprising a plug positioned in each of the passageways, wherein the plug includes a second material more resistant to thermal energy migration than a first material of the plurality of wall portions.

20. A frame structure for positioning a plurality of individual electrical energy storage cells, the frame structure comprising:
 a top surface;
 a bottom surface opposite to the top surface;
 a plurality of receptacles extending between the top surface and the bottom surface, the individual receptacles having a first depth;
 a plurality of wall portions each positioned between corresponding two of the plurality of receptacles;
 a plurality of passageways individually formed on each of the plurality of wall portions, the individual passageways having a second depth less than the first depth; and
 a tab extending laterally from one of the plurality of wall portions toward an adjacent one of the plurality of receptacles, wherein the tab is configured to be in contact with one of the plurality of individual electrical energy storage cells.

* * * * *